No. 793,419. PATENTED JUNE 27, 1905.
C. O. COLE.
DEVICE FOR HOLDING VALVES.
APPLICATION FILED APR. 2, 1904.
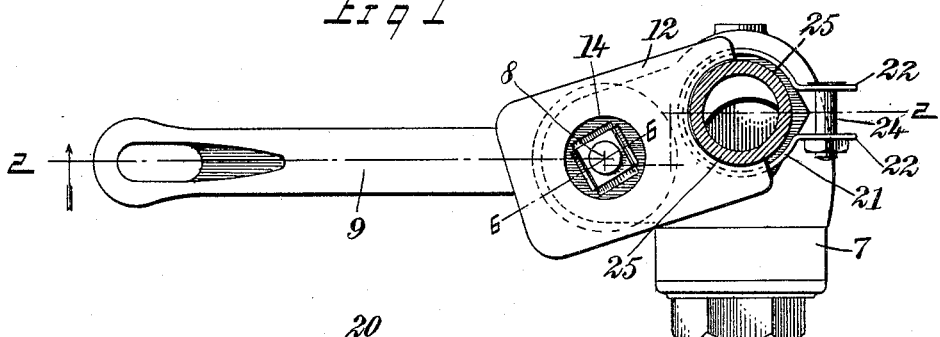
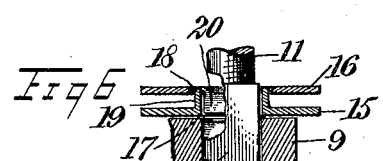
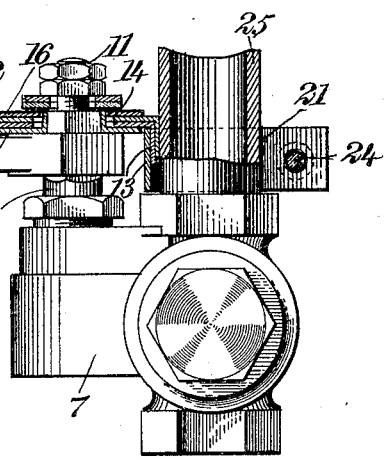
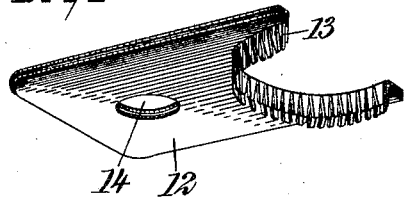
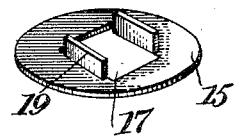
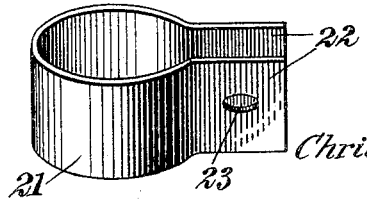
WITNESSES:
John J. Kittle
A. E. Fay
INVENTOR
Christopher O. Cole
BY
Munn
ATTORNEYS No. 793,419. Patented June 27, 1905.

UNITED STATES PATENT OFFICE.

CHRISTOPHER O. COLE, OF BELLINGHAM, WASHINGTON.

DEVICE FOR HOLDING VALVES.

SPECIFICATION forming part of Letters Patent No. 793,419, dated June 27, 1905.

Application filed April 2, 1904. Serial No. 201,225.

*To all whom it may concern:*

Be it known that I, CHRISTOPHER O. COLE, a citizen of the United States, and a resident of Bellingham, in the county of Whatcom and State of Washington, have invented a new and Improved Device for Holding Valves, of which the following is a full, clear, and exact description.

My invention relates to a device for holding valves and preventing their displacement when they are subjected to jarring or other motions.

The principal object of my invention is to provide for holding valves as stated and at the same time permit them to be opened and closed without the necessity of loosening or tightening any of the parts or using separate tools of any kind.

Further objects will appear in the course of the subjoined description.

Reference is to be had to the accompanying drawings, forming a part of this specification, in which similar characters of reference indicate corresponding parts in all the figures.

Figure 1 is a plan view of a valve-casing with a preferred form of my invention applied. Fig. 2 is a side view of the same, partly in section, on the line 2 2 of Fig. 1. Figs. 3, 4, and 5 are perspective views of details; and Fig. 6 is a fragmentary sectional view on the line 6 6 of Fig. 1.

In the drawings, 7 represents a valve-casing having a projecting valve-stem 8. I have shown a Lunkenheimer valve, and my device is especially applicable to this type; but it is to be understood that my invention is not limited thereto and that it may be applied to any kind of a valve.

9 is an ordinary lever used with certain types of valves. The valve-stem is provided with a square portion 10, as is usually the case, for the reception of the lever 9; but it should preferably be made longer when my improvement is to be used, and it is shown as supplied with a screw-thread 11 for the reception of a clamping-nut.

The main part of the holder consists of a friction-plate 12, shown as formed of two pieces of sheet metal, one superposed upon the other; but it will be obvious that it may be formed of a single piece or of more than two pieces and that it may be formed of other materials than sheet metal. At one end it is bent down, as shown at 13, for the purpose of abutting against a stationary object in order to secure it in a fixed position. It is also provided with a perforation 14, which should be large enough to permit the valve-stem and other parts to pass through without contacting with the edges of the perforation. A pair of special washers 15 16 is provided to bear upon the opposite sides of the friction-plate, as shown. These washers are provided with holes 17 18, which are preferably of the shape of the end of the valve-stem and fit close enough to it to be compelled to move with it. They are also provided with flanges 19 20, those on the upper washer extending downwardly through the perforation 14 and those on the lower washer extending upwardly through the same perforation. These two flanges are preferably formed on the same side of each washer and on opposite sides of the hole through the washer, two being used on each washer. The two sets of flanges are preferably located at ninety degrees to each other, so that taken together they substantially surround the valve-stem.

The usual common washers and nut, as well as a jam-nut, may be employed to hold the special washers in position, and the construction is such that the two special washers will be forced into frictional contact with the friction-plate 12, and thus will be held from rotation when any ordinary jarring or other motion is communicated to the valve-stem or other parts of the valve. When it is desired, however, to turn the lever 9, this can be done in the ordinary way by overcoming the frictional resistance of these parts and without the use of tools or the loosening of the nut. A convenient manner of holding the friction-plate in position is illustrated in the drawings.

21 is a clamp having projecting pieces 22 and perforations 23. Through the perforations 23 passes a bolt 24, which is adapted to tighten the clamp in the ordinary way around any object upon which it may be placed—as, for example, a pipe 25. In the use of this clamp the projection 13 on the plate 12 will be placed against the pipe 25, and the clamp upon being tightened will hold the friction-plate securely to the pipe. This is an important part of my invention, but it will be obvious that the friction-piece could be clamped to any other stationary object without departing from the spirit thereof.

It will be evident that by the use of this device the lever can be clamped in any position, so that the jar of the machinery to which the valve is attached will not cause the same to be displaced, and at the same time will permit the valve to be opened and closed in the ordinary way. Of course, if desired, it can be clamped tight enough to prevent movement of the lever and valve without loosening the nut by means of a wrench.

It is to be understood that my invention is capable of embodiment in many other forms than that illustrated and that many modifications can be made in the same without departing from the spirit of the invention.

Having thus described my invention, I claim as new and desire to secure by Letters Patent—

1. A valve-holder, comprising a plate having a portion extending from it at an angle thereto, a clamp for engaging and holding said portion, and frictional means for securing a valve-stem to the plate.

2. A valve-holder, comprising a plate having an arcuate portion extending from it at right angles thereto, a clamp for engaging and securing said portion, and means for frictionally securing a valve-stem to the plate.

3. A valve-holder comprising a friction-plate having a free passage therethrough for a valve-stem, means for holding said plate in fixed position, a washer in contact with said plate, and means for fixedly holding the washer with respect to the valve-stem.

4. The combination with a fixed friction-plate, of washers in frictional engagement therewith, said plate and washers having passages for a valve-stem, and means on said washers for securing them with respect to the valve-stem.

5. A device for holding valves, comprising a friction-plate having a passage therethrough for a valve-stem, a washer in frictional contact with the plate and having a perforation registering with said passage, a flange projecting into the passage in the plate and means for securing the valve-stem with respect to said plate.

6. A friction-plate for a valve-holder having a perforation, and a curved edge bent at right angles to the body of the plate.

7. The combination with a fixed friction-plate, of two washers in frictional engagement therewith, one on each side thereof, said plate and washers having passages therethrough for a valve-stem.

8. The combination with a fixed friction-plate, of a washer on each side thereof in frictional engagement therewith, said friction-plate having a passage therethrough, and each of said washers having a flange located in said passage.

9. A friction-plate for a valve-holder, having a perforation, and a curved serrated edge bent at right angles to the body of the plate.

In testimony whereof I have signed my name to this specification in the presence of two subscribing witnesses.

CHRISTOPHER O. COLE.

Witnesses:
P. F. WHITING,
G. B. PECK.